US010417152B2

(12) United States Patent
Carlough et al.

(10) Patent No.: US 10,417,152 B2
(45) Date of Patent: Sep. 17, 2019

(54) OPERATION OF A MULTI-SLICE PROCESSOR IMPLEMENTING DATAPATH STEERING

(71) Applicant: International Business Machines Corporation, Armonk, NY (US)

(72) Inventors: Steven R. Carlough, Poughkeepsie, NY (US); Kurt A. Feiste, Austin, TX (US); Brian W. Thompto, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 15/172,635

(22) Filed: Jun. 3, 2016

(65) Prior Publication Data

US 2017/0351523 A1     Dec. 7, 2017

(51) Int. Cl.
    *G06F 9/38*           (2018.01)
    *G06F 13/36*         (2006.01)

(52) U.S. Cl.
    CPC ............ *G06F 13/36* (2013.01); *G06F 9/3828* (2013.01); *G06F 9/3836* (2013.01); *G06F 9/3838* (2013.01); *G06F 9/3851* (2013.01); *G06F 9/3855* (2013.01); *G06F 9/3891* (2013.01)

(58) Field of Classification Search
    CPC ..... G06F 9/3838; G06F 9/3836; G06F 9/3855
    USPC ................................... 712/218, 214
    See application file for complete search history.

(56) References Cited

U.S. PATENT DOCUMENTS

| 4,885,703 | A | | 12/1989 | Deering | |
|---|---|---|---|---|---|
| 5,613,080 | A | * | 3/1997 | Ray ..................... | G06F 9/3836 712/214 |
| 5,699,537 | A | * | 12/1997 | Sharangpani ......... | G06F 9/3822 712/217 |
| 5,864,341 | A | * | 1/1999 | Hicks .................... | G06F 9/3824 712/214 |
| 6,088,784 | A | * | 7/2000 | Choquette ............. | G06F 9/3001 712/32 |
| 6,219,780 | B1 | * | 4/2001 | Lipasti ................. | G06F 9/3824 712/206 |
| 6,289,437 | B1 | * | 9/2001 | Eisen .................... | G06F 9/3836 712/217 |
| 6,378,063 | B2 | * | 4/2002 | Corwin ................ | G06F 9/3836 712/206 |

(Continued)

OTHER PUBLICATIONS

Hennessy et al., Computer Architecture—A Quantitative Approach, 5th Ed., 2012. Selected pages. (Year: 2012).*

(Continued)

*Primary Examiner* — Yuqing Xiao
(74) *Attorney, Agent, or Firm* — Nathan M. Rau

(57) ABSTRACT

Operation of a multi-slice processor implementing datapath steering, where the multi-slice processor includes a plurality of execution slices. Operation of such a multi-slice processor includes: identifying, from a set of instructions, a second instruction that is dependent upon a first instruction in the set of instructions; and responsive to the second instruction being dependent upon the first instruction in the set of instructions, issuing each of the instructions in the set of instructions to a particular set of execution slices configured with bypass logic between execution slices that reduces execution latencies between dependent instructions.

13 Claims, 7 Drawing Sheets

(56) References Cited

U.S. PATENT DOCUMENTS

| | | | |
|---|---|---|---|
| 6,728,866 B1* | 4/2004 | Kahle | G06F 9/3828 |
| | | | 711/173 |
| 6,760,836 B2* | 7/2004 | Hondou | G06F 9/3836 |
| | | | 712/214 |
| 6,948,051 B2 | 9/2005 | Rivers et al. | |
| 7,373,485 B2* | 5/2008 | Ando | G06F 9/3012 |
| | | | 712/218 |
| 2007/0121499 A1 | 5/2007 | Pal et al. | |
| 2008/0133889 A1* | 6/2008 | Glew | G06F 9/3012 |
| | | | 712/214 |
| 2011/0004743 A1* | 1/2011 | Lutz | G06F 9/3016 |
| | | | 712/214 |
| 2017/0351524 A1 | 12/2017 | Carlough et al. | |

OTHER PUBLICATIONS

Appendix P; List of IBM Patent or Applications Treated as Related, Aug. 19, 2016, 2 pages.

* cited by examiner

OPERATION OF A MULTI-SLICE PROCESSOR IMPLEMENTING DATAPATH STEERING

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Operation of such a multi-slice processor includes: identifying, from a set of instructions, a second instruction that is dependent upon a first instruction in the set of instructions; and responsive to the second instruction being dependent upon the first instruction in the set of instructions, issuing each of the instructions in the set of instructions to a particular set of execution slices configured with bypass logic between execution slices that reduces execution latencies between dependent instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
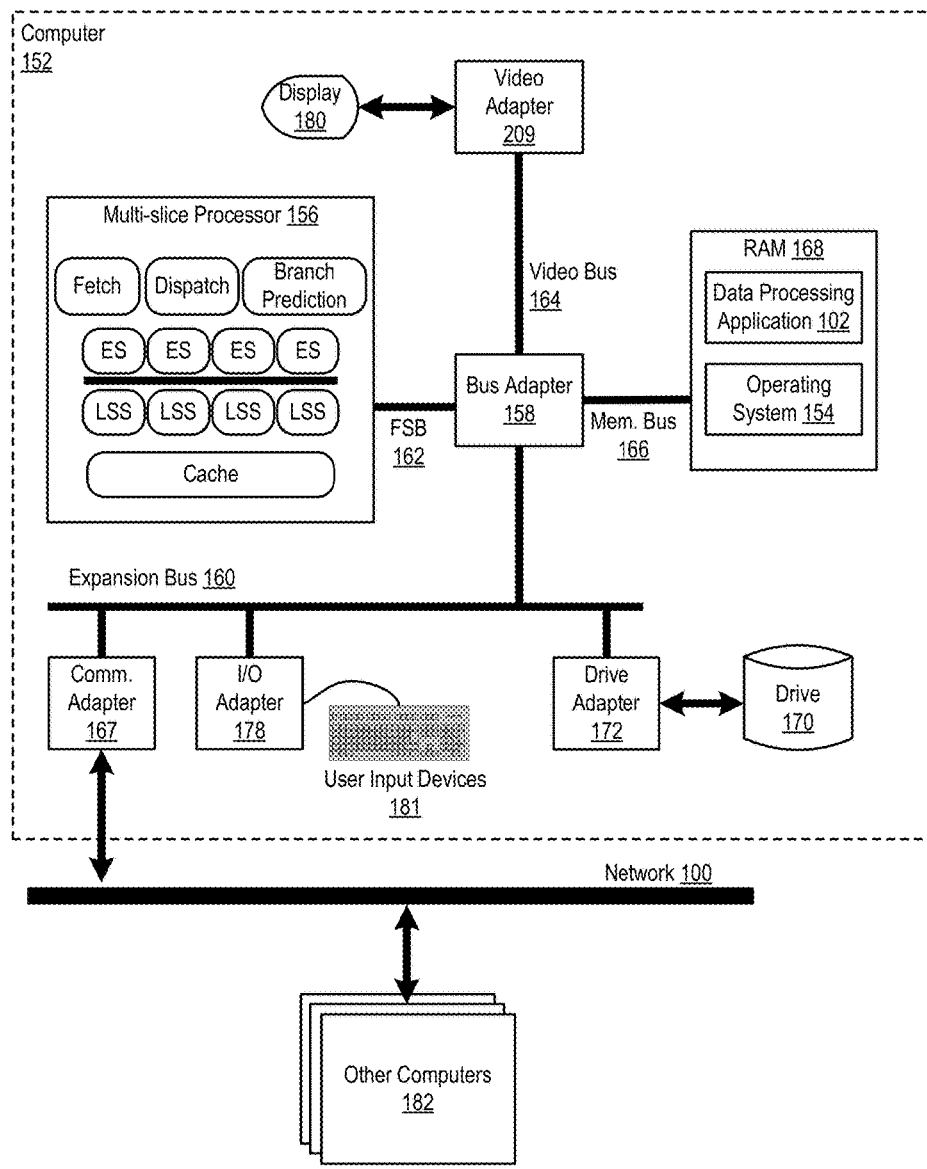
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
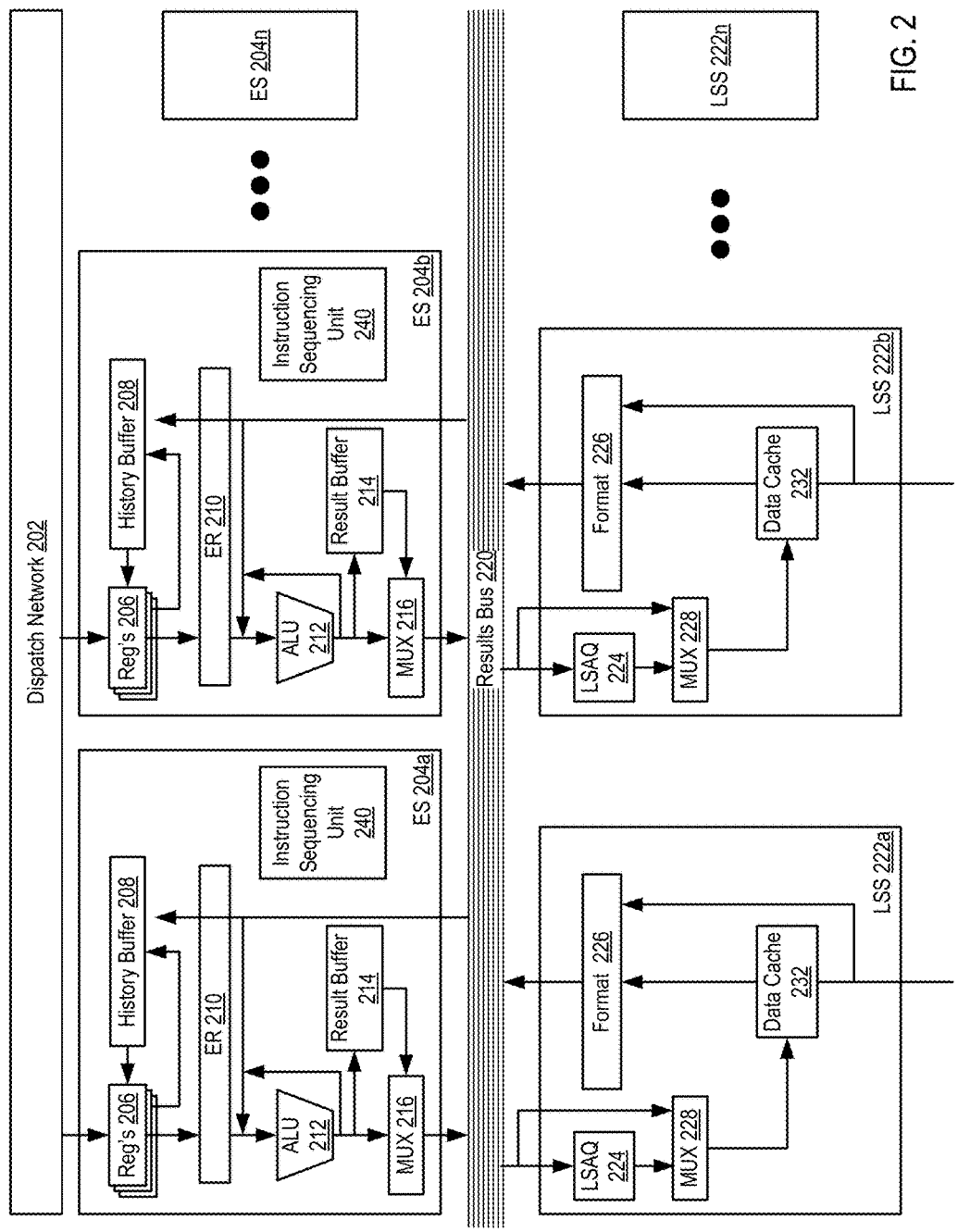
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted within individual execution slices, in some cases, the instruction sequencing unit may be implemented independently of the execution slices or implemented within dispatch network (202). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
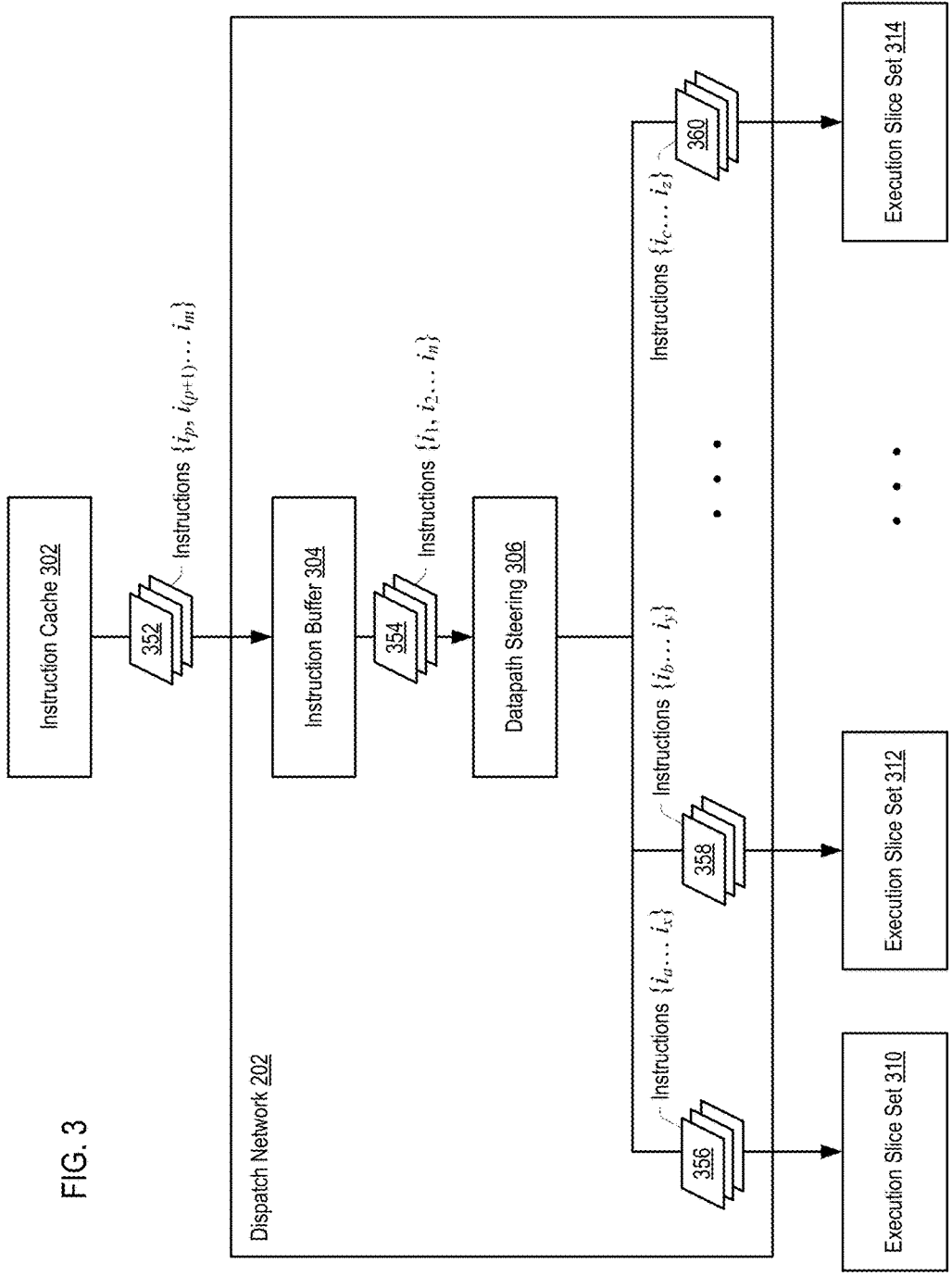
FIG. 3 sets forth a block diagram of a dispatch network configured to implement datapath steering according to different embodiments.

For further explanation, FIG. 3 sets forth a block diagram of a portion of the dispatch network (202) of the multi-slice processor (156) implementing datapath steering. During normal operation, the dispatch network (202) receives computer instructions from an instruction cache (302), and dispatches the computer instructions among the various execution slices (204a, 204b-204n). Often, these computer instructions from the instruction cache (302) correspond to software written by a user and compiled for the multi-slice processor (156). A datapath may be considered to be a collection of functional units, or logic, from the dispatch unit to a given execution slice or to a given set of execution slices.

In some cases, a second instruction executing on a second execution slice that is dependent on a first instruction executing on a first execution slice may execute with reduced latency by using bypass logic that is configured to pass results from execution components in the first execution slice executing the first instruction to an operand register or registers in the second execution slice for use by the second instruction. However, due to resource constraints, bypass logic may be configured to pass results between execution slices within a set of execution slices, and not configured to pass results between any execution slice and any other execution slice.

Consequently, the dispatch network (202) may receive a plurality of instructions, determine dependencies between the instructions, and steer, direct sets of instructions that include dependencies to a set of execution slices that are configured with bypass logic for passing results between execution slices of the set of execution slices. In some cases, a set of execution slices may include two execution slices, such as execution slice (240a) and execution slice (240b)—where two execution slices may together be considered a "superslice."

As depicted in FIG. 3, the dispatch network (202) may receive instructions (352), which includes the set of instructions $\{i_p, i_{(p+1)} \ldots i_m\}$, from the instruction cache (302). Received instructions may be stored within the instruction buffer (304). Previously received instructions, instructions (354), which include the set of instructions $\{i_1, i_2 \ldots i_n\}$, may be accessed from the instruction cache (304).

Given a set of instructions, such as the set of instructions (354), the datapath steering (306) logic may determine dependencies among the set of instructions (354) to generate one or more sets of instructions, including instructions (356), (358), through (360). Further, a set, such as sets (356), (358), and (360), may include a single instruction, or multiple instructions with more than one dependency between the instructions in the set.

In this example, the set of instructions (354) may be subdivided into sets, or subsets, (356), (358), and (360), where a union of the sets (356), (358), and (360) are equal to the set of instructions (354). As depicted in FIG. 3, set (356) includes instructions $\{i_a \ldots i_x\}$, set (358) includes instructions $\{i_b \ldots i_y\}$, and set (360) includes instructions $\{i_c \ldots i_z\}$. However, in some cases, the set of instructions provided to a set of execution slices may include instructions from different sets of received instructions, such as instructions from instructions (354) and (352) where a second instruction in the set of instructions provided to a set of execution slices is dependent on a first instruction in the set of instructions, and where the second instruction is from instructions (352) and the first instruction is from instructions (354). In this case, the set of dependent instructions may be steered to sets of execution slices where bypass paths are present.

Further, set of instructions (356) may be steered toward, or issued to, execution slice set (310), set of instructions (358) may be steered toward, or issued to, execution slice set (312), and set of instructions (360) may be steered toward, or issued to, execution slice set (314)—where a given execution slice set (310)-(314) may include multiple execution slices from among the execution slices of the multi-slice processor (156).

In this way, the dispatch network (202) may issue sets of instructions to sets of execution slices such that a given set of execution slices receiving a given set of instructions may use bypass logic between the execution slices in the given set of execution slices to more efficiently execute the given set of instructions—where using the bypass logic allows for reduced execution latencies in executing the dependent instructions in the given set of instructions.

Figure 4:
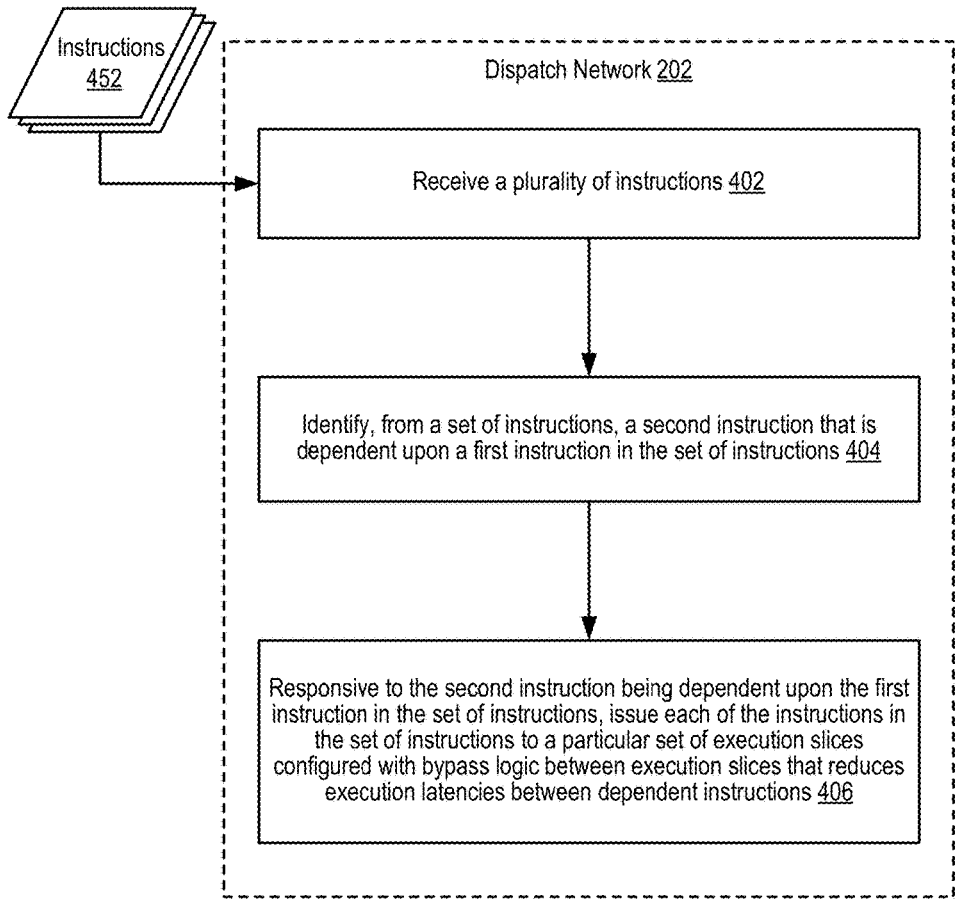
FIG. 4 sets forth a flow chart illustrating an exemplary method of operation of a multi-slice processor configured to implement datapath steering according to different embodiments.

For further explanation, FIG. 4 sets forth a flow chart illustrating an exemplary method of datapath steering. The method of FIG. 4 may be carried out by a multi-slice processor similar to that in the examples of FIGS. 1-3. Such a multi-slice processor may include a dispatch network (202) that includes datapath steering (306) logic, as described above with regard to FIG. 3.

The method of FIG. 4 includes receiving (402) a plurality of instructions (452). Receiving (402) the plurality of instruction (452) may be carried out by the dispatch network (202) receiving instructions at an instruction buffer (304) from an instruction cache (302), as depicted in FIG. 3.

The method of FIG. 4 also includes identifying (404), from a set of instructions (452), a second instruction that is dependent upon a first instruction in the set of instructions. Identifying (404) the second instruction that is dependent upon the first instruction may be carried out by the datapath steering (306) logic of the dispatch network determining instructions to include in the set of instructions in dependence upon determining that a result from an instruction in the received plurality of instructions (452) is an operand of another instruction in the received plurality of instructions (452). A similar determination of dependency may be carried out for each pair of received instructions of the received plurality of instructions (452) in order to identify a plurality of sets of instructions such that at least one instruction in each set of instructions is dependent upon another instruction in the set of instructions. In some cases, the received plurality of instructions (452) may be instructions currently being stored in the instruction buffer (304).

In other words, given an analysis of dependency between pairs of instructions received, the datapath steering (306) logic may group instructions with at least one dependency between them into sets of instructions. Defining a given set of instructions may be carried out by the datapath steering (306) logic setting a bitcode within the opcode for each instruction in a set of instructions to be the same value. For example, a number of bits within an instruction opcode may be specified to define an identifying token. In this way, for example, if a first set of instructions includes instructions A and B, and a second set of instructions includes instructions C and D, then the bitcode for opcodes for instructions A and B may be set to "01," and the bitcode for opcodes for instructions C and D may be set to "10"—where an identifying token of "00" may indicate no dependency on another instruction.

The instruction sequencing unit, responsive to receiving the instructions with opcodes defined with identifying tokens, may issue the instructions for execution on the execution slices in a set of execution slices, such as a superslice, such that the bypass logic between the execution slices may pass results from a previous instruction to a subsequent, dependent, instruction. In other words, the previous and subsequent instructions in the set of instructions determined to include a dependency may be issued within a same cycle, or the dependent instruction may be issued at a number of cycles after the previous instruction is begun so that latencies experienced by the second instruction are reduced.

The method of FIG. 4 also includes, responsive to the second instruction being dependent upon the first instruction in the set of instructions, issuing (406) each of the instructions in the set of instructions to a particular set of execution slices configured with bypass logic between execution slices that reduces execution latencies between dependent instructions. Issuing (406) each of the instructions in the set of instructions to the particular set of execution slices may be carried out by the dispatch network (202) sending each of the instructions in the set of instructions to an instruction sequencing unit or units to the same set of execution slices, such as a superslice. In other words, in this example, no instructions within a same set of instructions go to different execution slices that are part of different sets of execution slices since such a distribution of issued instructions would be unable to make use of bypass logic for reducing execution latencies between dependent instructions.

In some cases, an independent instruction may be sent to a first, or lower numbered, execution slice within the set of execution slices, and a dependent instruction may be sent to a second, or sequentially higher numbered, execution slice within the set of execution slices. For example, if a superslice includes executions slices (204a) and (204b), as depicted in FIG. 2, then an independent instruction of the set of instructions may be sent to execution slice (204a) and an instruction dependent on the independent instruction of the set of instructions may be sent to execution slice (204b), where the superslice of execution slice (204a) and (204b) includes bypass logic.

In this way, the dispatch network (202) may issue sets of instructions to sets of execution slices such that a given set of execution slices receiving a given set of instructions may use bypass logic between the execution slices in the given set of execution slices to more efficiently execute the given set of instructions—where using the bypass logic allows for reduced execution latencies in executing the dependent instructions in the given set of instructions.

Figure 5:
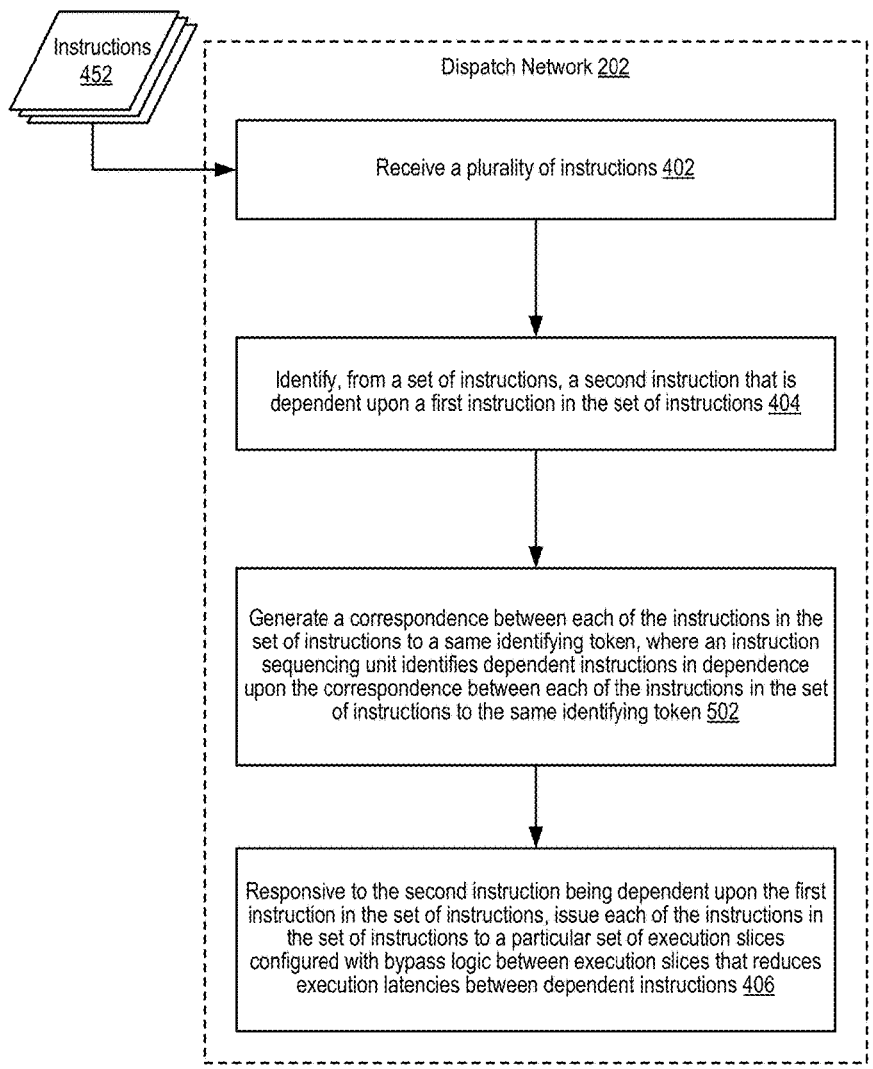
FIG. 5 sets forth a flow chart illustrating an exemplary method of operation of a multi-slice processor configured to implement datapath steering according to different embodiments.

For further explanation, FIG. 5 sets forth a flow chart illustrating an exemplary method of operation of a multi-slice processor implementing datapath steering. The method of FIG. 5 may be carried out by a multi-slice processor similar to that in the examples of FIGS. 1-3. Such a multi-slice processor may include a plurality of execution slices and a dispatch network, as described above with regard to FIGS. 1-3.

The method of FIG. 5 is similar to the method of FIG. 4 in that the method of FIG. 5 also includes: receiving (402) a plurality of instructions (452); identifying (404), from a set of instructions (452), a second instruction that is dependent upon a first instruction in the set of instructions; and responsive to the second instruction being dependent upon the first instruction in the set of instructions, issuing (406) each of the instructions in the set of instructions to a particular set of execution slices configured with bypass logic between execution slices that reduces execution latencies between dependent instructions.

The method of FIG. 5 differs from the method of FIG. 4, however, in that the method of FIG. 5 further includes, prior to issuing (406) each of the instructions in the set of instructions to the set of execution slices, generating (502) a correspondence between each of the instructions in the set of instructions to a same identifying token, where an instruction sequencing unit identifies dependent instructions in dependence upon the correspondence between each of the instructions in the set of instructions to the same identifying token.

Generating (502) the correspondence between each of the instructions in the set of instructions to a same identifying token may be carried out by the datapath steering (306) logic setting a bitcode within opcodes for each of the instructions in the set of instructions to a same bit value, where an instruction sequencing unit may decode the bitcode for the identifying token to determine dependencies between instructions so that the instructions may be issued in a way that makes use of bypass logic between the execution slices in the set of execution slices.

Figure 6:
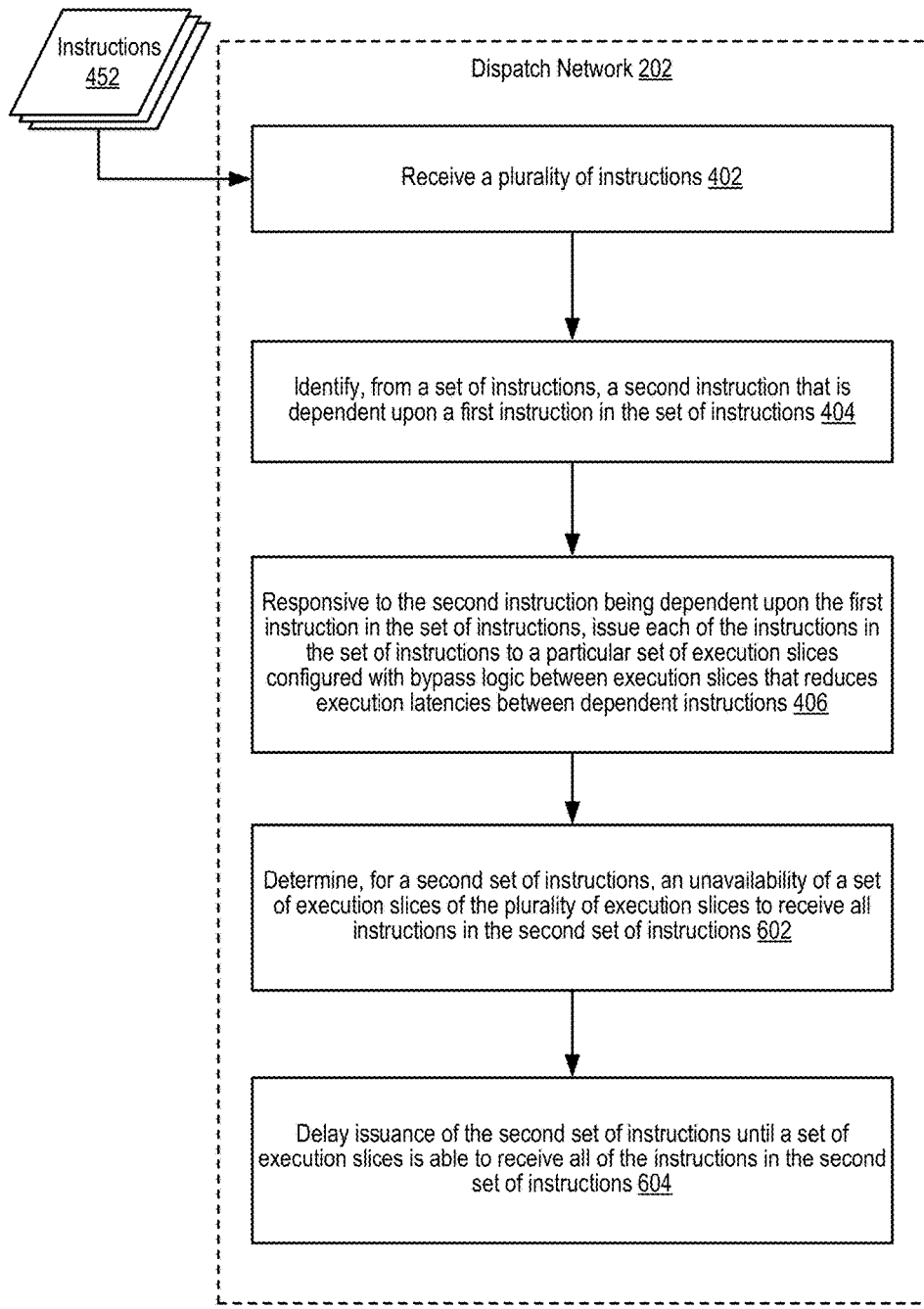
FIG. 6 sets forth a flow chart illustrating an exemplary method of operation of a multi-slice processor configured to implement datapath steering according to different embodiments.

For further explanation, FIG. 6 sets forth a flow chart illustrating an exemplary method of operation of a multi-slice processor implementing datapath steering. The method of FIG. 6 may be carried out by a multi-slice processor similar to that in the examples of FIGS. 1-3. Such a multi-slice processor may include a plurality of execution slices and a dispatch network, as described above with regard to FIGS. 1-3.

The method of FIG. 6 is similar to the method of FIG. 4 in that the method of FIG. 6 also includes: receiving (402) a plurality of instructions (452); identifying (404), from a set of instructions (452), a second instruction that is dependent upon a first instruction in the set of instructions; and responsive to the second instruction being dependent upon the first instruction in the set of instructions, issuing (406) each of the instructions in the set of instructions to a particular set of execution slices configured with bypass logic between execution slices that reduces execution latencies between dependent instructions.

The method of FIG. 6 differs from the method of FIG. 4, however, in that the method of FIG. 6 further includes: determining (602), for a second set of instructions, an unavailability of a set of execution slices of the plurality of execution slices to receive all instructions in the second set of instructions—where the set of instructions determined at (404) may be considered a first set of instructions, and where the second set of instructions is one of the one or more sets of instructions described above with regard to FIG. 4; and delaying (604) issuance of the second set of instructions until a set of execution slices is able to receive all of the instructions in the second set of instructions.

Determining (602), for the second set of instructions, an unavailability of a set of execution slices may be carried out by the dispatch network (202) communicating with the execution slices of each of the sets of execution slices to receive information on whether a set of execution slices may handle, or receive, the quantity of instructions in the second set of instructions.

Delaying (604) issuance of the second set of instructions until a set of execution slices is able to receive all of the instructions in the second set of instructions may be carried out by the dispatch network, in dependence upon communications with execution slices from each of the sets of execution slices, determining that a particular set of execution slices is able to handle, or receive, the quantity of instructions in the second set of instructions. Responsive to receiving a signal, or communication from execution slices in the particular set of execution slices, the dispatch network (202) may issue all of the instructions to the particular set of execution slices.

While the second set of instructions may be delayed from issuing, other instructions may continue to be issued, generally, the reduction in execution latencies from the instructions being sent together to a same set of execution slices to use bypass logic within the set of execution slices is greater than cycles that may be spent delaying the issuance of the second set of instructions.

Figure 7:
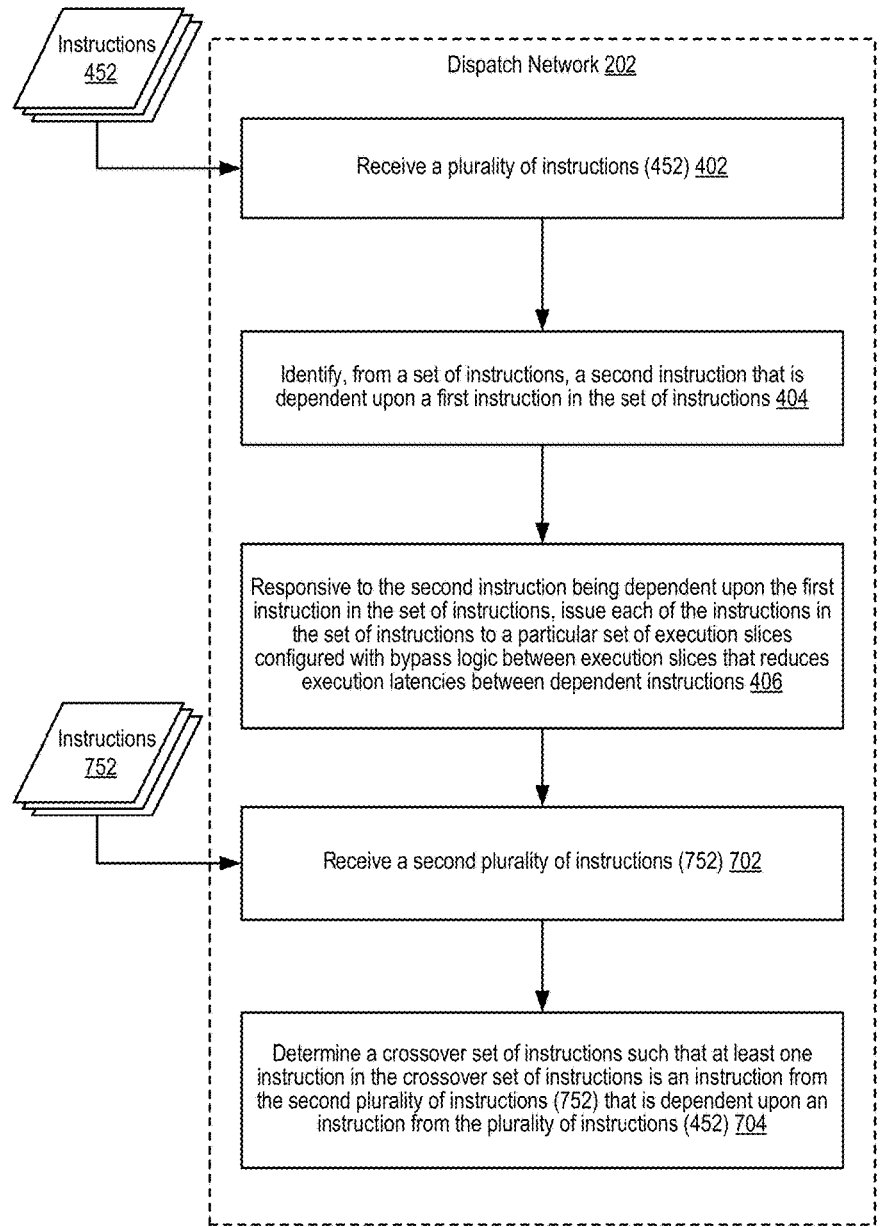
FIG. 7 sets forth a flow chart illustrating an exemplary method of operation of a multi-slice processor configured to implement datapath steering according to different embodiments.

For further explanation, FIG. 7 sets forth a flow chart illustrating an exemplary method of operation of a multi-slice processor implementing datapath steering. The method of FIG. 7 may be carried out by a multi-slice processor similar to that in the examples of FIGS. 1-3. Such a multi-slice processor may include a plurality of execution slices and a dispatch network, as described above with regard to FIGS. 1-3.

The method of FIG. 7 is similar to the method of FIG. 4 in that the method of FIG. 7 also includes: receiving (402) a plurality of instructions (452); identifying (404), from a set of instructions (452), a second instruction that is dependent upon a first instruction in the set of instructions; and responsive to the second instruction being dependent upon the first instruction in the set of instructions, issuing (406) each of the instructions in the set of instructions to a particular set of execution slices configured with bypass logic between execution slices that reduces execution latencies between dependent instructions.

The method of FIG. 7 differs from the method of FIG. 4, however, in that the method of FIG. 7 further includes: receiving (702) a second plurality of instructions (752); and determining (704) a crossover set of instructions such that at least one instruction in the crossover set of instructions is an instruction from the second plurality of instructions (752) that is dependent upon an instruction from the plurality of instructions (452) received at (402).

Receiving (702) the second plurality of instruction (752) may be carried out by the dispatch network (202) receiving instructions at an instruction buffer (304) from an instruction cache (302), as depicted in FIG. 3.

Determining (704) a crossover set of instructions may be carried out by the dispatch network (202) receiving both sets of instructions, instructions (452) and instructions (752), before grouping all the instructions from the instructions (452) received first. As another example, it may be that, as depicted in FIG. 3, instructions (354) and (352) are buffered in instruction buffer (304) at a same time. In other words, there are no dependency boundaries between sets of received instructions, and the dispatch network (202) may buffer multiple sets of instructions and analyze all buffered instructions for dependencies in order to determine set of instructions that include dependencies as described with regard to (404).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multi-slice processor comprising:
   an instruction cache containing a plurality of instructions;
   a plurality of execution slices; and
   a dispatch network including logic to dispatch the plurality of instructions for execution among the execution slices, wherein the dispatch network is configured to carry out:
      prior to issuing a set of instructions to one or more instruction sequencing units, identifying, from the set of instructions, a second instruction in the set of instructions that is dependent upon a first instruction in the set of instructions; and
      responsive to the second instruction being dependent upon the first instruction in the set of instructions, issuing each of the instructions in the set of instructions to one or more instruction sequencing units of a set of execution slices configured with bypass logic between execution slices that reduces execution latencies between dependent instructions.

2. The multi-slice processor of claim 1, wherein the bypass logic is configured to pass results from the first instruction in a first execution slice in a set of execution slices to an operand register for the second instruction in a second execution slice in the set of execution slices.

3. The multi-slice processor of claim 1, wherein a set of execution slices comprises two of the plurality of execution slices.

4. The multi-slice processor of claim 1, wherein the dispatch network is further configured to carry out:
   prior to issuing each of the instructions in the set of instructions to one or more instruction sequencing units of the set of execution slices:
      generating a correspondence between each of the instructions in the set of instructions to a same identifying token, wherein each instruction sequencing unit identifies dependent instructions in dependence upon the correspondence between each of the instructions in the set of instructions to the same identifying token.

5. The multi-slice processor of claim 4, wherein the same identifying token comprises a bit code setting within each opcode of each instruction in the set of instructions.

6. The multi-slice processor of claim 1, wherein the dispatch network is further configured to carry out:
   determining, for a second set of instructions, an unavailability of a set of execution slices of the plurality of execution slices to receive all instructions in the second set of instructions; and
   delaying issuance of the second set of instructions until a set of execution slices is able to receive all of the instructions in the second set of instructions.

7. The multi-slice processor of claim 1, wherein the dispatch network is further configured to carry out:
   receiving a second set of instructions; and
   determining a crossover set of instructions such that at least one instruction in the crossover set of instructions is an instruction from the second set of instructions that is dependent upon an instruction from the set of instructions.

8. An apparatus comprising:
   a computer memory for storing program instructions; and
   a multi-slice processor for executing the computer program instructions, wherein the multi-slice processor comprises an instruction cache containing a plurality of instructions, a plurality of execution slices, and a dispatch network including logic to dispatch the plurality of instructions for execution among the execution slices, wherein the dispatch network is configured to carry out:
      prior to issuing a set of instructions to one or more instruction sequencing units, identifying, from the set of instructions, a second instruction in the set of instructions that is dependent upon a first instruction in the set of instructions; and
      responsive to the second instruction being dependent upon the first instruction in the set of instructions, issuing each of the instructions in the set of instructions to one or more instruction sequencing units of a set of execution slices configured with bypass logic between execution slices that reduces execution latencies between dependent instructions.

9. The apparatus of claim 8, wherein the bypass logic is configured to pass results from the first instruction in a first execution slice in a set of execution slices to an operand register for the second instruction in a second execution slice in the set of execution slices.

10. The apparatus of claim 8, wherein a set of execution slices comprises two of the plurality of execution slices.

11. The apparatus of claim 8, wherein the dispatch network is further configured to carry out:
   prior to issuing each of the instructions in the set of instructions to one or more instruction sequencing units of the set of execution slices:

generating a correspondence between each of the instructions in the set of instructions to a same identifying token, wherein each instruction sequencing unit identifies dependent instructions in dependence upon the correspondence between each of the instructions in the set of instructions to the same identifying token.

12. The apparatus of claim 11, wherein the same identifying token comprises a bit code setting within each opcode of each instruction in the set of instructions.

13. The apparatus of claim 8, wherein the dispatch network is further configured to carry out:
    determining, for a second set of instructions, an unavailability of a set of execution slices of the plurality of execution slices to receive all instructions in the second set of instructions; and
    delaying issuance of the second set of instructions until a set of execution slices is able to receive all of the instructions in the second set of instructions.

\* \* \* \* \*